United States Patent Office 3,613,441
Patented Oct. 19, 1971

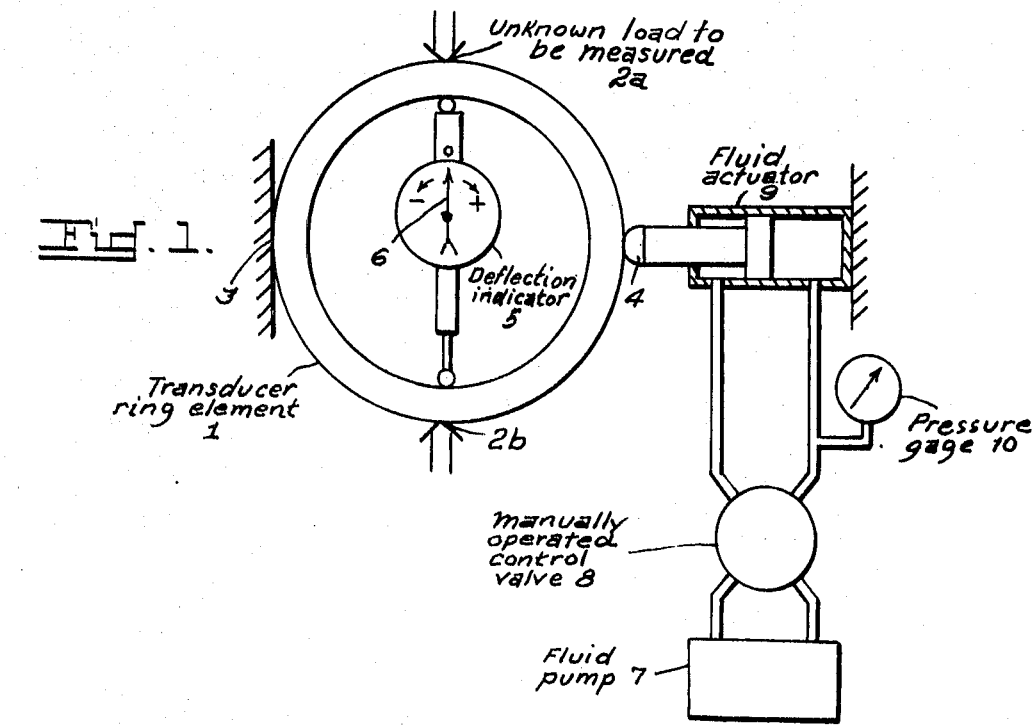
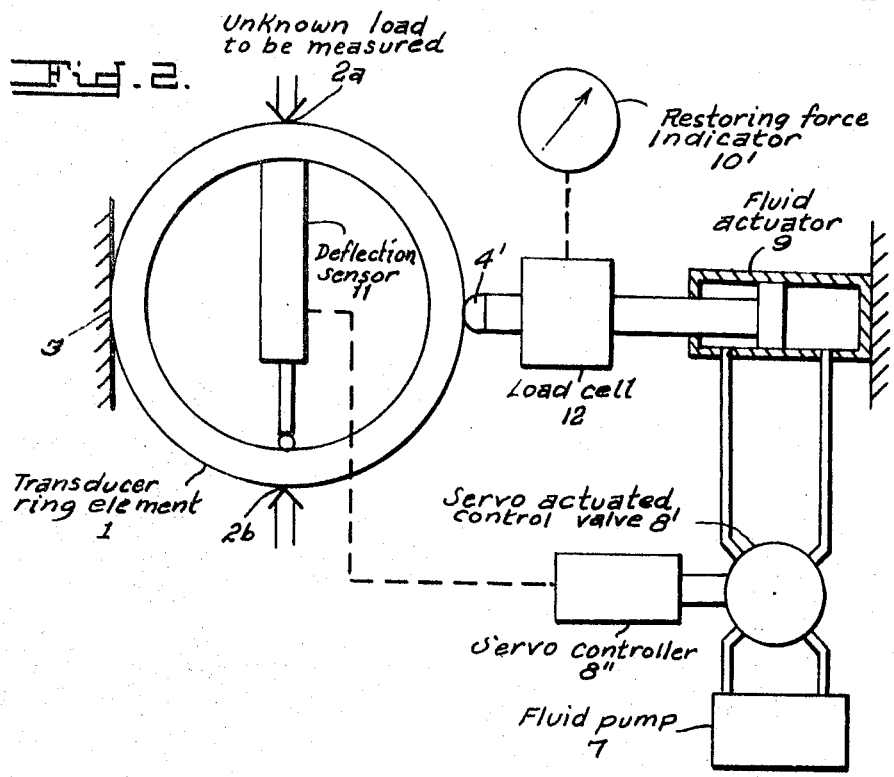

3,613,441
ZERO DEFLECTION LOAD TRANSDUCER
Ralph R. Papirno, Norfolk, Mass., assignor to the United States of America as represented by the Secretary of the Army
Filed Jan. 19, 1970, Ser. No. 3,662
Int. Cl. G01l 5/12
U.S. Cl. 73—141 A                       6 Claims

ABSTRACT OF THE DISCLOSURE

A load to be measured tends to deflect, crush or warp a ring type of transducer. However, a sensor detects the slightest deflection or warping of the ring and actuates apparatus to restore the ring so that the net result is substantially zero deflection of the transducer ring. The force required of the apparatus, to hold the transducer ring or to restore the ring to zero deflection, is proportional to the force applied to the ring. By measuring this force, by a hydraulic pressure gage, for example, the magnitude of the load to be measured can be ascertained. In simple terms, a "heavy duty" yet very sensitive scale is provided to indicate light or heavy weight or force. Nevertheless, the sensing element incurs substantially zero deflection. And, this is true even when comparatively lightweight and inexpensive apparatus is used.

---

The invention described herein may be manufactured, used, and licensed by or for the Government for governmental purposes without the payment to me of any royalty thereon.

The concept of a diametrally loaded ring has been used for many years as a preferred calibration device for testing machines. The deflection of such a ring in the loading direction under a diametral load is linearly related to the applied load. Therefore, the deflection versus linear relationship can be established by calibration against a primary dead-weight standard. However, in the present invention, with comparatively lightweight and sensitive apparatus, the deflection is held to or returned to substantially zero, while retaining the virtue of a linear readout in proportion to the load applied.

In existing apparatus, the rigidity of materials testing machines which apply loads to specimens depends upon the combined rigidity of the structural elements and that of the elastic load transducer in the system. It is desirable for some tests in such apparatus to maximize the rigidity of the system. High structural rigidity of the apparatus is easily attained with heavy frames etc. However, increasing the rigidity of the elastic load transducer decreases its sensitivity since, in such transducers, the load is inferred from the magnitude of the elastic deformation of the transducer elastic element.

The invention described herein is a load transducer which has a very high effective rigidity in the loading direction yet displays the same or higher sensitivity than a comparable conventional transducer. The elastic element of the new transducer is a ring. The load to be measured is applied at the extremes of a diameter of the ring. The ring would have a natural tendency to deflect in the direction of the applied load. This deflection is suppressed by a second load, also applied diametrally, at right angles to the load to be measured.

The deformation versus load characteristics, of a specimen to be tested, beyond the elastic limit, are influenced by the "softness" or "hardness" (stiffness) of the testing machine.

In testing practice testing machines are classified as either "soft" or "hard," "soft" machines having a low spring constant (coefficient of restitution) and "hard" machines having a high spring constant. In the latter type (hard machines) the spring constant includes the effect of the load measuring device. This invention provides a load measuring device whose spring constant is essentially infinitely large, thereby allowing the construction of an extremely hard machine while maintaining comparatively lightweight construction, and a comparatively high degree of sensitivity.

In the drawing:
FIG. 1 is a schematic diagram of one form of the invention;
FIG. 2 is a schematic diagram of another form of the invention.

In FIG. 1 transducer ring element 1 has an unknown load to be measured applied thereto at diametrically opposed points or areas 2a and 2b. This load tends to warp or collapse the ring in the vertical direction and bulge the ring into an ellipse with its long axis extending horizontally. The horizontal bulging is prevented on the left side by stationary abutment 3. On the right side bulging is prevented by fluid pressure actuated piston rod 4. (Alternatively, if bulging to the right has occurred piston rod 4 may be forced to the left to eliminate the bulge.) Deflection indicator 5 indicates roundness of transducer ring element 1 if the pointer 6 is centered on "0" (zero). If the ring is a noncircular ellipse forces would generally be applied along the major and minor axes. If the ring is a noncircular ellipse with the long axis vertical pointer 6 will register "—" (negative from "0"). If the ring is a noncircular ellipse in the opposite direction the pointer will register "+" (positive from "0").

The output of fluid pump 7 is applied through control valve 8 to fluid actuator 9 to hold, extend or retract piston rod 4. Pressure gage 10 indicates the degree of force exerted on the piston and piston rod 4.

Operation, FIG. 1

If it be assumed that the fluid in the system is noncompressible (liquid) and the rigid parts are nonbendable, and with valve 8 closed, then the equal but opposite forces applied at 2a and 2b will cause a direct pressure readout on gage 10. This pressure readout will be directly proportional to the forces applied at 2a and 2b. This is because the forces tend to warp ring 1 to an elliptical form but piston rod 4 restrains the ring in its circular form and the degree of force needed to restrain rod 4 from movement is directly proportional to the degree of force tending to warp the ring into an elliptical form. Therefore, after calibrating pressure gage 10, the readout will indicate the pressures applied at 2a and 2b in ounces, pounds, tons, grams, kilograms or any other desired unit of measurement.

For convenience in describing the principles involved the parts and fluid have been described as noncompressible. Although this is theoretically possible the practical aspects may dictate slight compensation for compression within ring 1, or for slight bending thereof in the four quadrants between the points of force application, or slight compressibility of liquid in the system, or greater compressibility if a gaseous fluid is used. Provision is made to compensate for such factors, or wear, or imperfect machining of parts, or imperfect fits or assembly, or such. If ring 1 should begin to deflect, with indicator needle 6 moving off from the "0" position, additional fluid from pump 7 may be introduced through valve 8 to pressurize piston rod 4 to hold or restore needle 6 to its "0" position. This holds, or restores, ring 1 to zero deflection. And, the pressure readout on gage 10, when properly calibrated, indicates the degree of force at 2a and 2b.

Ring element 1 is described as circular. However, a circle is a special form of an ellipse. Therefore, other forms of ellipses could be used if desired to substitute for ring 1. Mathematically it can be shown that the degree of sensitivity, versus ruggedness, can be altered by choosing an ellipse with its long axis extending vertical, or one with its axis extending horizontal. And, the lengths of the respective axes may be chosen to yield the desired degree of sensitivity versus ruggedness. Other geometrical shapes could be used, such as double-ended Gothic arch, parabola, hyperbola, or diamond-shape, square or rectangle with loading applied at the apices (pointed ends), or other shapes. Each shape would have its individual characteristics and the apparatus could be designed and calibrated accordingly.

In FIG. 1 the elements are illustrated as being compression elements, that is, forces 2a and 2b act to compress ring 1 from opposite sides and deflection indicator 5 is under compressive forces. Piston rod 4 and abutment 3 are in compression. It would be possible to reverse these forces. Tension could be applied at 2a and 2b thereby pulling tension on deflection indicator 5 and tending to warp ring 1 vertically. This would place abutment 3 and piston rod 4 (which would be attached to ring 1), under tension to resist inward warping of ring 1 at those points. The degree of force required, by actuator 9, to prevent inward deflection will be proportional to the forces applied outwardly at 2a and 2b.

FIG. 2 illustrates a modification including sophisticated control apparatus and associated force indicator apparatus. In FIG. 2 deflection indicator 5 is replaced by a conventional deflection sensor 11. Piston rod 4' has a conventional load cell 12 incorporated therein. Sensor 11 controls valve 8' through servo controller 8''. Restoring force indicator 10' indicates force applied to piston rod 4' through load cell 12.

In the FIG. 2 modification sensor 11 automatically controls valve 8' to apply pressure from actuator 9 to piston rod 4' to hold or restore ring 1 to its original shape as soon as forces 2a and 2b tend to warp ring 1. The degree of force required is registered on indicator 10' although a fluid pressure gage could be used similar to gage 10 in FIG. 1.

Other modifications will become apparent to those skilled in the art.

I claim:

1. Force measuring apparatus comprising a ring, restraining means preventing movement of said ring in a first direction, first force means of an unknown degree to apply a force to said ring in a second direction to tend to warp or collapse the ring, second actuator force means to apply a force in a third direction to tend to restore said ring to its original condition, the degree of force exerted by said second force means being proportional to the unknown degree of force of said first force means, and means to indicate the degree of said second force means to thereby indirectly indicate the magnitude of the degree of force exerted by said first force means.

2. Apparatus as in claim 1 wherein said ring is circular.

3. Apparatus as in claim 1 wherein said ring is a noncircular ellipse and has its long axis extending substantially in the direction of said first force.

4. Apparatus as in claim 1 and deflection sensor means to sense degree of deflection of said ring by said first force means.

5. Apparatus as in claim 4 and means connected to said deflection sensor and said second actuator force means to automatically apply a restoring force in said third direction in response to deflection detected by said sensor.

6. Apparatus as in claim 5 and a restoring force indicator to indicate the degree of restoring force applied in said third direction and to thereby indirectly indicate the magnitude of force applied by said first force means in said second direction.

References Cited

UNITED STATES PATENTS

| | | | |
|---|---|---|---|
| 2,662,539 | 12/1953 | Markson | 177—208 |
| 2,667,071 | 1/1954 | Ramey et al. | 73—141 |
| 2,849,669 | 8/1958 | Kinkel | 318—32 |
| 3,022,663 | 2/1962 | Diddens | 73—141 |
| 3,133,607 | 5/1964 | Gardner et al. | 177—108 |
| 3,139,750 | 7/1964 | Smith et al. | 73—141 |
| 3,339,419 | 9/1967 | Wilcox | 73—517 |

RICHARD C. QUEISSER, Primary Examiner

J. J. WHALEN, Assistant Examiner

U.S. Cl. X.R.

177—208